United States Patent
Villar

(10) Patent No.: US 11,448,278 B2
(45) Date of Patent: Sep. 20, 2022

(54) SHOCK ABSORBING DEVICE WITH ANGULAR LOCKING

(71) Applicant: ETA SA Manufacture Horlogère Suisse, Grenchen (CH)

(72) Inventor: Ivan Villar, Bruegg (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 36 days.

(21) Appl. No.: 17/077,014

(22) Filed: Oct. 22, 2020

(65) Prior Publication Data

US 2021/0190165 A1 Jun. 24, 2021

(30) Foreign Application Priority Data

Dec. 18, 2019 (EP) .................................... 19217506

(51) Int. Cl.
*G04B 31/02* (2006.01)
*F16F 1/34* (2006.01)

(52) U.S. Cl.
CPC ................ *F16F 1/34* (2013.01); *G04B 31/02* (2013.01); *F16F 2224/0208* (2013.01); *F16F 2226/04* (2013.01); *F16F 2234/02* (2013.01); *F16F 2234/06* (2013.01)

(58) Field of Classification Search
CPC .. F16F 1/34; F16F 2224/0208; F16F 2226/04; F16F 2234/02; F16F 2234/06; G04B 31/02; G04B 31/04; G04B 37/052
See application file for complete search history.

(56) References Cited

U.S. PATENT DOCUMENTS 10,114,339 B2 * 10/2018 Merino ................ G04B 37/052
11,169,487 B2 * 11/2021 Merino ................ G04B 31/04
(Continued)

FOREIGN PATENT DOCUMENTS

CH   698 675 B1   9/2009
CH   705 075 A2   12/2012
(Continued)

OTHER PUBLICATIONS

European Search Report dated Jun. 3, 2020 in European Application 19217506.5 filed on Dec. 18, 2019 (with English Translation of Categories of Cited Documents), citing documents AA-AB & AO-AT therein, 3 pages.

(Continued)

*Primary Examiner* — Thomas W Irvin
(74) *Attorney, Agent, or Firm* — Oblon, McClelland, Maier & Neustadt, L.L.P.

(57) ABSTRACT

A shock absorbing device including a spring ring able to adopt a mounting position and an attachment position respectively with respect to the support of the shock absorbing device. This spring ring includes, on the external periphery thereof, tabs which engage with a peripheral shoulder of the support of the shock absorbing device provided with recesses which outnumber the tabs. In the attachment position, only some of the tabs are disposed under the peripheral shoulder of the support, the remaining tabs, including locking tabs, respectively housed in locking recesses, of the support. In the attachment position, at least one locking tab housed in a locking recess is surrounded by tabs positioned under the peripheral shoulder.

11 Claims, 5 Drawing Sheets

(56) References Cited

U.S. PATENT DOCUMENTS

| | | | |
|---|---|---|---|
| 2006/0187767 A1* | 8/2006 | Conus | G04B 31/04 368/324 |
| 2006/0215499 A1* | 9/2006 | Kohler | G04B 31/04 368/324 |
| 2017/0261937 A1* | 9/2017 | Merino | G04B 31/04 |
| 2019/0010781 A1 | 4/2019 | Merino et al. | |
| 2019/0107810 A1* | 4/2019 | Merino | G04B 37/052 |

FOREIGN PATENT DOCUMENTS

| | | |
|---|---|---|
| CH | 707 501 A2 | 7/2014 |
| CN | 204178142 U | 2/2015 |
| CN | 105247420 A | 1/2016 |
| CN | 106873343 A | 6/2017 |
| CN | 107193198 A | 9/2017 |
| CN | 109656120 A | 4/2019 |
| EP | 3 220 211 A1 | 9/2017 |
| EP | 3 470 934 A1 | 4/2019 |
| FR | 1 008 173 A | 5/1952 |

OTHER PUBLICATIONS

Combined Chinese Office Action and Search Report dated Nov. 3, 2021 in Chinese Patent Application No. 202011502784.X (with English translation of Categories of Cited Documents), cited documents AO-AS therein, 7 pages.

\* cited by examiner

SHOCK ABSORBING DEVICE WITH ANGULAR LOCKING

CROSS-REFERENCE TO RELATED APPLICATION

This application claims priority to European Patent Application No. 19217506.5 filed on Dec. 18, 2019, the entire disclosure of which is hereby incorporated herein by reference.

FIELD OF THE INVENTION

The present invention concerns a shock absorbing device for a wheel set arbor of a micromechanical device, particularly, but not exclusively, a timepiece movement. It more specifically concerns a shock absorbing device comprising means for locking in rotation the shock absorber spring.

BACKGROUND OF THE INVENTION

Shock absorbing devices, also called 'shock absorber bearings' or 'anti-shock systems' have been known for a long time by manufacturers of mechanical watches. The purpose of these shock absorbing devices is to enable an arbor to absorb the resultant energy of a shock, in particular a lateral shock, by allowing it to move momentarily from the rest position thereof, and then return to this rest position under the effect of an elastic return force. It will be understood that, in micromechanical mechanisms in general, and in timepiece movements in particular, the majority of arbors extend vertically with respect to the plane in which such micromechanical mechanisms or timepiece movements extend. A timepiece movement can thus essentially be subjected to two different types of shock: either an axial shock, if the watch falls substantially flat on a surface; or a lateral shock, if the watch falls on the side of the case middle. Of the two types of shock, the lateral shock is the most hindersome. Indeed, in the event of an axial shock, the resultant force of this shock is exerted substantially perpendicularly to the back of the watch, and thus approximately parallel to the direction in which the arbors of the timepiece movement extend. The risks of these arbors becoming uncoupled or breaking are thus relatively limited. However, in the event of a lateral shock, the resultant force of the shock is exerted in a direction approximately perpendicular to the arbors, such that the risk of the arbors leaving their housing and/or breaking is high.

To overcome this problem, the manufacturers of mechanical watches and other micromechanical mechanisms have therefore proposed shock absorbing devices. Briefly summarized, such shock absorbing devices comprise a support, the base of which has no bottom in order to allow the passage of an arbor ending in a pivot-shank. The support accommodates a setting, which is a part of generally annular shape and which carries, superposed, a jewel hole traversed by the pivot-shank of the arbor, and an endstone. The assembly formed by the setting, the jewel hole and the endstone is held elastically in the support by means of a spring element which is removably mounted on the support and exerts an elastic pressing force on the endstone. Such shock absorbing devices are marketed, in particular, under the brand name Incabloc®. As regards the spring element, it can be made of brass or with a spring steel such as the austenitic cobalt-chrome grade marketed under the brand name Phynox©KL, and is conventionally obtained by cutting techniques.

In the event of axial shock, the jewel hole, the endstone and the arbor move substantially perpendicularly to the back cover of the watch, against the elastic return force of the spring element which returns the entire assembly to the rest position.

In the event of lateral shock, the arbor will be knocked out of alignment and will collide with the base of the support, which causes the jewel hole, and therefore the setting and the endstone, to move off-centre. In this case too, the spring element returns all the elements to their position of equilibrium.

FIGS. 1A and 1B represent such a shock absorbing device 1 with the spring element 2 fixed to a support 3. Spring element 2 in the form of a spring ring comprises three evenly spaced arms 4 which press pivot module 5 into the housing of the support. The spring ring is mounted on the support via a bayonet attachment. For this purpose, support 3 comprises a peripheral shoulder 6, which extends from the rim 7 of support 3 towards the centre of support 3. In order to engage with peripheral shoulder 6, spring ring 2 is provided on its outer periphery with three evenly spaced lugs 8 which extend radially away from the centre of spring ring 2. These three lugs 8 give spring ring 2 an outer diameter which exceeds the inner diameter of peripheral shoulder 6. Consequently, to allow spring ring 2 to be assembled on support 3, three notches 9 are provided in peripheral shoulder 6. Therefore, in order to mount spring ring 2 on support 3, it is simply necessary to position said spring ring such that the three lugs 8 engage in the corresponding three notches 9 and then to pivot it to allow lugs 8 to slide under peripheral shoulder 6.

As explained above, a shock absorbing device is intended to allow a micromechanical arbor, for example housed in a timepiece movement, to absorb the resultant energy of a shock without breaking, particularly a lateral shock, by allowing the arbor to move momentarily under the effect of a shock, before elastically returning it to the rest position thereof. Depending on the intensity of the shock and the direction in which it is applied, the spring ring is nonetheless likely to pivot on itself and it is quite possible for the spring ring to find itself in a situation where the three lugs are inserted in the corresponding three notches. In such a situation, the spring ring may be uncoupled from the support. The arbor is then no longer held by the shock absorbing device, which inevitably causes failure of the mechanical device, for example a timepiece device, in which this shock absorbing device is installed. Such a risk is even less acceptable given that, in the field of watchmaking in particular, shock absorbing devices are mostly fitted in watches that belong to the upper segment of the market.

To overcome this problem, it was proposed in European Patent No. EP3220211 to spot-face the peripheral shoulder in the areas located between two successive notches. The term 'spot-facing' means the action of adjusting the lower surface of the peripheral shoulder by removing material using a rotary blade. Thus, between two successive notches, clearances are created in which the lugs are housed.

The above solution did not prove to be entirely satisfactory. Firstly, the clearances in which the lugs are housed proved to be of insufficient depth and the peripheral edges thereof of insufficient height to ensure satisfactory prevention of the angular pivoting of the spring ring in case of shocks, particular in case of lateral shocks. Furthermore, machining clearances using a milling cutter, usually a T-type cutter, proved to be extremely time-consuming and tedious, with unpredictable results. During the machining operations, in particular, it was necessary to take care not to cut into the inner diameter of the peripheral shoulder. The feed rates of the T cutter were low, and vibrations occurred in the milling tool. Finally, despite the care taken in the milling operations, it was not uncommon for burrs to remain in the clearances.

Another solution was proposed in European Patent No. EP3470934. This solution consists in machining not only first notches in the peripheral shoulder, but also second notches in which the lugs engage to ensure angular immobilisation of the ring. This solution is satisfactory, but there is still a need for solutions that avoid accidental disassembly of the shock absorber, following a rotational movement of the spring in the support.

SUMMARY OF THE INVENTION

It is an object of the present invention to propose a shock absorbing device wherein the risks of the various components becoming uncoupled in the event of axial or lateral shock are considerably reduced, or even eliminated.

More precisely, the present invention concerns a shock absorbing device comprising a spring ring able to adopt a mounting position and an attachment position with respect to the support of the shock absorbing device. The spring ring moves from its mounting position to its attachment position and vice versa by applying pressure to the spring ring and by imparting a rotational movement to the spring ring. This spring ring comprises, on the external periphery thereof, tabs, also called lugs, which engage with a peripheral shoulder of the support of the shock absorbing device provided with recesses which outnumber the tabs. According to the invention, these recesses are intended for the mounting and for the attachment of the spring ring on the support. Preferably, they are of similar shape and dimensions to those of the tabs.

The present invention is characterized in that, in the attachment position, only some of the tabs are disposed under the peripheral shoulder of the support, the remaining tabs, comprising one or more tabs, called the locking tabs, respectively being housed in the extra recess or recesses, called the locking recesses, of the support. In the attachment position, at least one locking tab housed in a locking recess is surrounded by tabs positioned underneath the peripheral shoulder. These tabs positioned under the peripheral shoulder of the support are subjected to a force applied by said peripheral shoulder. The application of this force causes a curved deformation of the section of the spring ring disposed between the two points of application of the force. Following this deformation, the locking tab arranged on this section changes shape slightly, which causes the immobilisation thereof inside the locking recess and thereby prevents any rotation of the spring ring with respect to the support.

In the prior art, all the tabs are disposed under the peripheral shoulder of the support with the result that the spring ring is held in the same plane when it is in the attachment position (in the absence of shocks). According to the invention, the spring ring is curved on certain sections thereof when in the attachment position, which ensures improved locking of the spring ring in its attachment position.

Other features and advantages of the present invention will appear upon reading the following detailed description, with reference to the following Figures.

BRIEF DESCRIPTION OF THE DRAWINGS

According to the prior art, the aforementioned FIG. 1A schematically illustrates in a perspective view a shock absorbing device provided with a spring ring capable of angular movement in case of shock.

FIG. 2A shows the positioning of the spring ring on the support during mounting and FIG. 2B shows the positioning of the spring ring during attachment.

FIG. 5A shows the positioning of the spring ring on the support during mounting and FIG. 5B shows the positioning of the spring ring during attachment.

DETAILED DESCRIPTION OF THE INVENTION

Figure 1A:
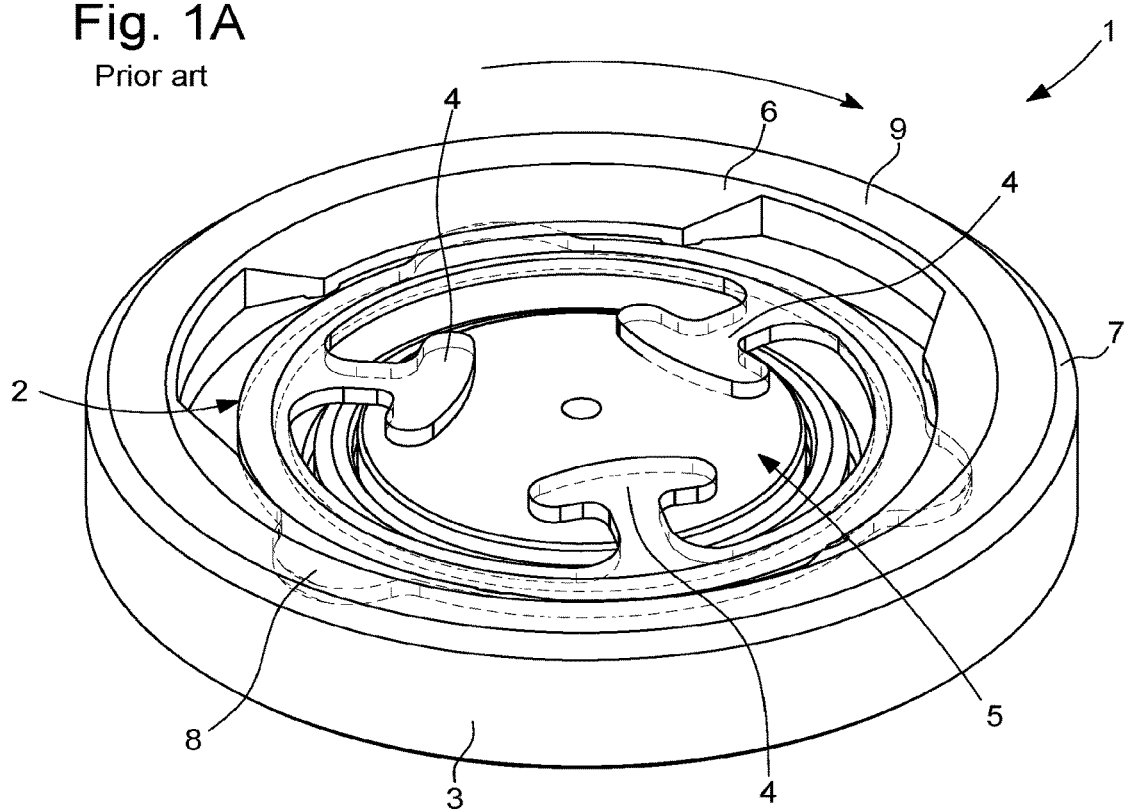
FIG. 1B represents a straight cross-sectional view of this same shock absorbing device.
Figure 1B:
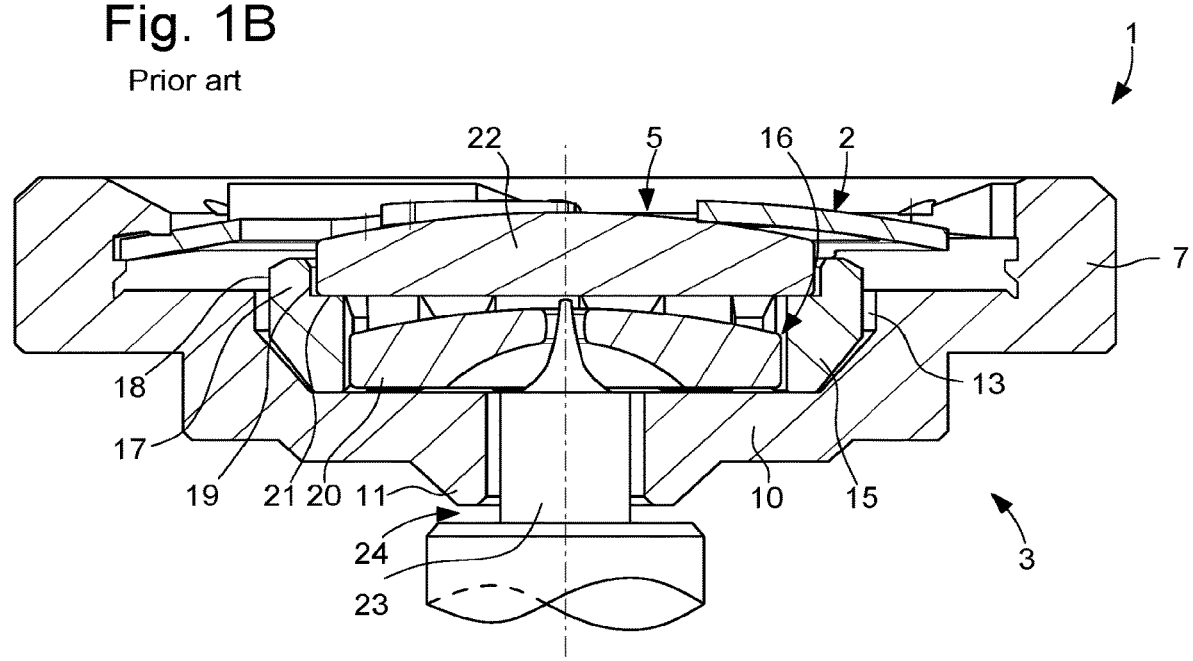

The present invention relates to a shock absorbing device. In a known manner, as represented in FIGS. 1A and 1B, shock absorbing device 1 comprises, in particular, a support 3, which takes the form of a cup-like element 10 a base 11 of which has no bottom and which is delimited at its periphery by a first rim 7. Support 3 has a peripheral shoulder 6 which extends from first rim 7 towards the centre of the support.

Rim 7 and cup 10 define a housing 13, into which a pivot module 5 is inserted. This pivot module 5 includes a setting 15, i.e. a part having a circular central orifice and a second rim 17 delimited by an outer side wall 18 and an inner side wall 19. A jewel hole 20, whose diameter corresponds to that of circular central orifice 16, is inserted into circular central orifice 16. Inner side wall 19 of setting 15 is provided with a shoulder 21 on which is placed an endstone 22.

Pivot module 5 thus arranged is placed inside housing 13 of support 3, then the assembly thereby obtained is inserted, for example, into an orifice of a timepiece bottom plate or in one of the bars or bridges of a timepiece movement. Pivot module 5 is arranged to cooperate with a pivot-shank 23 of an arbor 24.

Shock absorbing device 1 further comprises elastic means 2 arranged to cooperate with pivot module 5 in order to dampen shocks and return pivot module 5 to the rest position thereof when the forces induced by the shocks fade away. These elastic means 2 are attached with bayonets on support 3 and are preferably also in contact with pivot module 5.

Figure 2A:
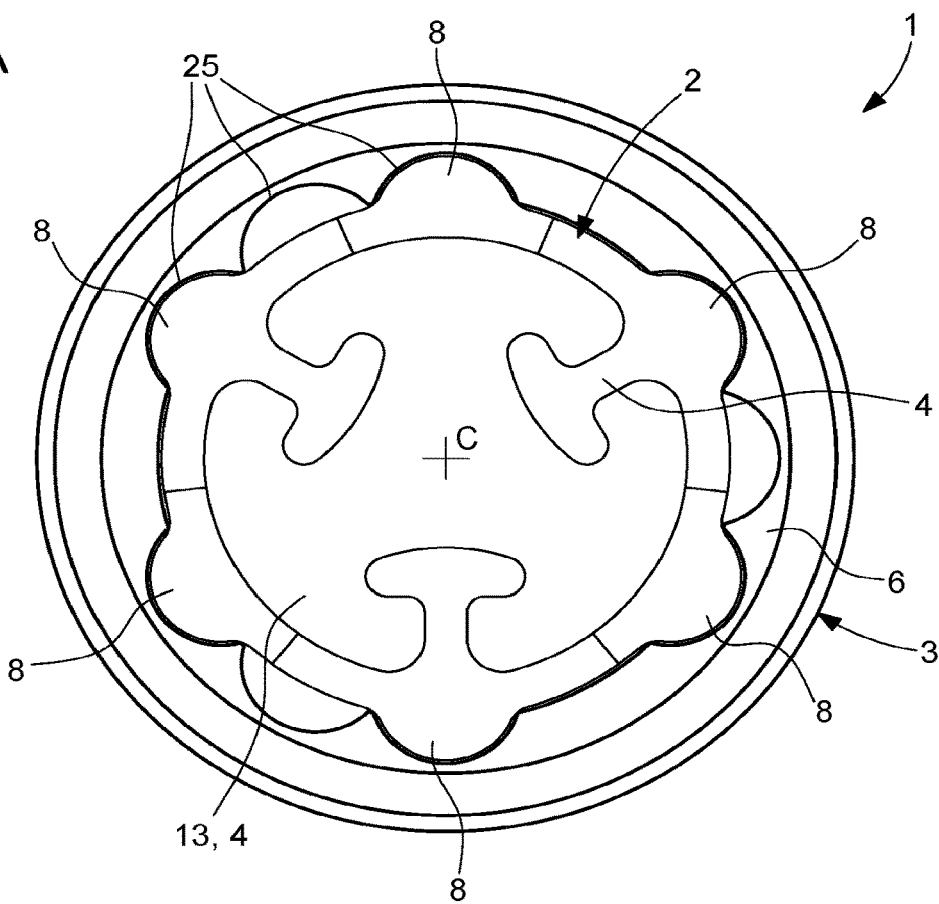
FIGS. 2A and 2B are schematic plan views of the shock absorbing device according to a variant of the invention with three locking tabs.

As represented in FIG. 2A according to the invention, elastic means 2 advantageously take the form of a flat type of spring ring, i.e. cut into a strip or ribbon whose width is substantially greater than its thickness. This spring ring is circular in shape, centred on a point C. It is preferably made of a crystalline metallic material, in particular a steel. It can also be made of an amorphous metal alloy or of a plastic material.

Spring ring 2 has, for example, three evenly spaced arms 4 which extend radially towards the centre C of spring ring 2. These three arms 4 enable spring ring 2 to press pivot module 5 into housing 13 of support 3. It is also possible to envisage making a spring ring with a minimum of two arms.

Figure 2B:
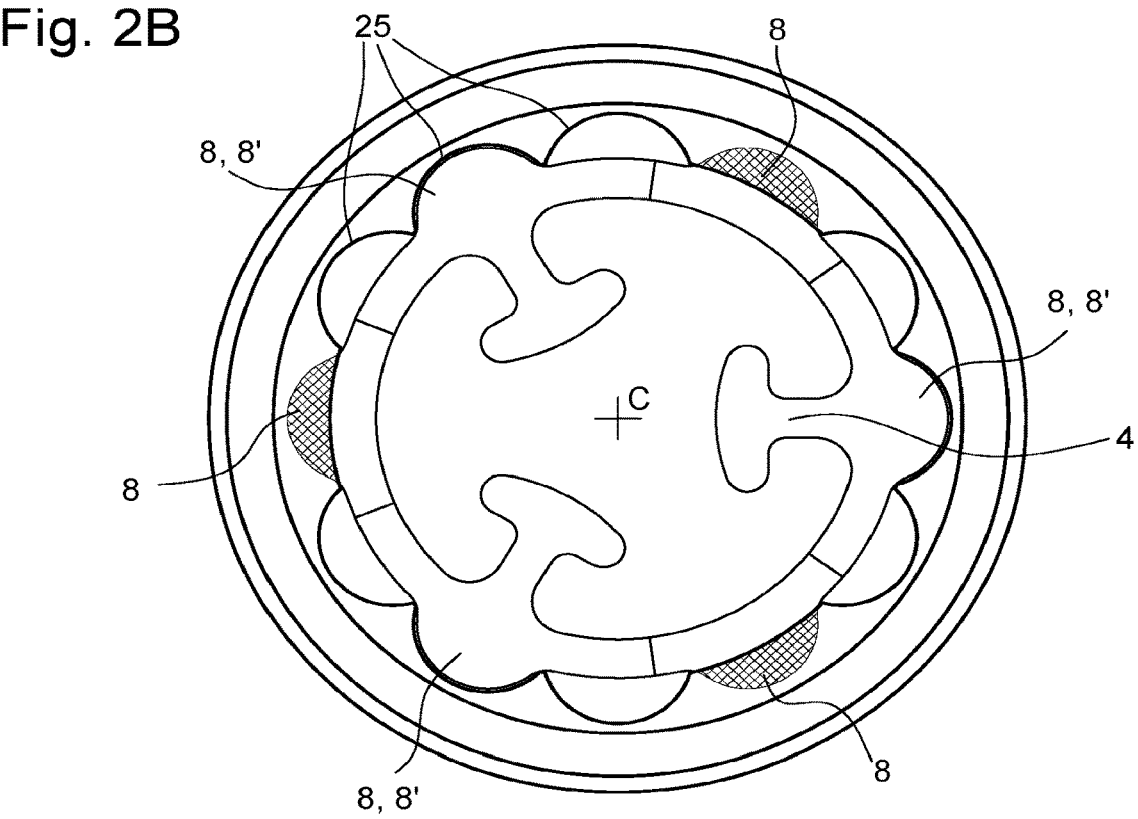

Spring ring 2 according to the invention is provided on the outer periphery thereof with a plurality of tabs 8 which extend radially away from centre C. Tabs 8 give spring ring 2 an outer diameter that exceeds the inner diameter of peripheral shoulder 6 of support 3. Advantageously, the tabs have a circular ear shape. Other shapes can also be envisaged: triangular, rectangular, etc. The tabs must be at least three in number. This configuration with only three tabs is, however, more suitable when the spring ring has only two arms. Advantageously, they are at least four in number as in the variant of FIGS. 5A and 5B. Preferably, they are six in number, as in the variant of FIGS. 2A and 2B. These tabs are preferably distributed at regular intervals over the outer periphery of the spring ring as illustrated in FIGS. 2A and 2B for the preferred variant. At least one of tabs 8, called the locking tab referenced 8' in the Figures, will be used to lock the spring ring in the angular position thereof after attachment to the support.

Arms 4 can be arranged facing tabs 8 as illustrated in FIG. 2A with, in a configuration with six tabs, one arm arranged facing every other tab. According to the variant of FIG. 5A with four tabs, arms 4 are either arranged between two tabs 8, or facing tabs 8.

Figure 5A:
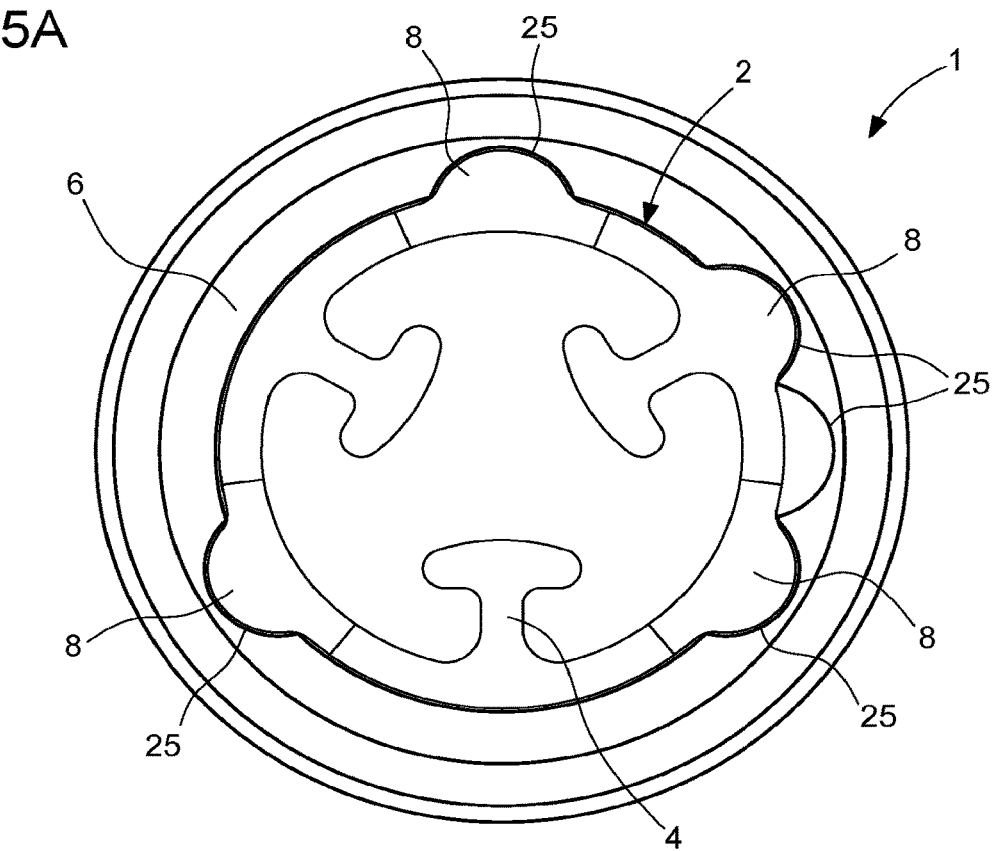
FIGS. 5A and 5B are schematic plan views of the shock absorbing device according to a variant of the invention with one locking tab.

According to the invention, peripheral shoulder 6 of support 3 has several recesses 25 opening onto the housing of the support accommodating the pivot module. These recesses have dimensions (width and depth) at least equal to those of the tabs so as to allow tabs 8 to engage in the corresponding recesses 25 during mounting. Preferably, these recesses 25 are each of similar shape and dimensions to those of tabs 8 as represented in FIGS. 2A and 5A. In these examples, the tabs and the recesses are of similar shape and dimensions with a circular ear shape. It is also possible to envisage the recess having one dimension (width or depth) substantially equal to that of the tab and the other dimension of greater size.

According to the invention, the number of recesses is at least one greater than the number of tabs. It must be at least equal to the number of tabs to enable the spring ring to be mounted on the support. These mounting recesses have a similar angular distribution to that of the tabs to allow said mounting. It must also comprise at least one extra recess, called the locking recess referenced 25' in the Figures, in which locking tab 8' is housed during attachment. Preferably, this locking recess 25' is adjacent to at least one mounting recess 25. According to the preferred variant represented in FIGS. 2A and 2B, the number of tabs 8 is six and the number of recesses 25 is nine. Of these six tabs 8, three are so-called locking tabs 8' which are housed in three locking recesses 25' during attachment. According to the variant represented in FIGS. 5A and 5B, the number of tabs 8 is four and the number of recesses 25 is five with one locking tab 8' being housed during attachment in one locking recess 25'.

Preferably, recesses 25 are arranged on at least one angular portion of peripheral shoulder 6 in a series of three recesses 25 arranged side-by-side as shown in FIGS. 2A and 5A. In this series of three, the two recesses 25 at the ends allow the engagement of one tab 8 respectively during mounting and the central recess forms locking recess 25' for housing locking tab 8' during attachment. Preferably, support 3 comprises three series of three recesses 25 spaced apart from each other at an angle of 120°.

Figure 3:
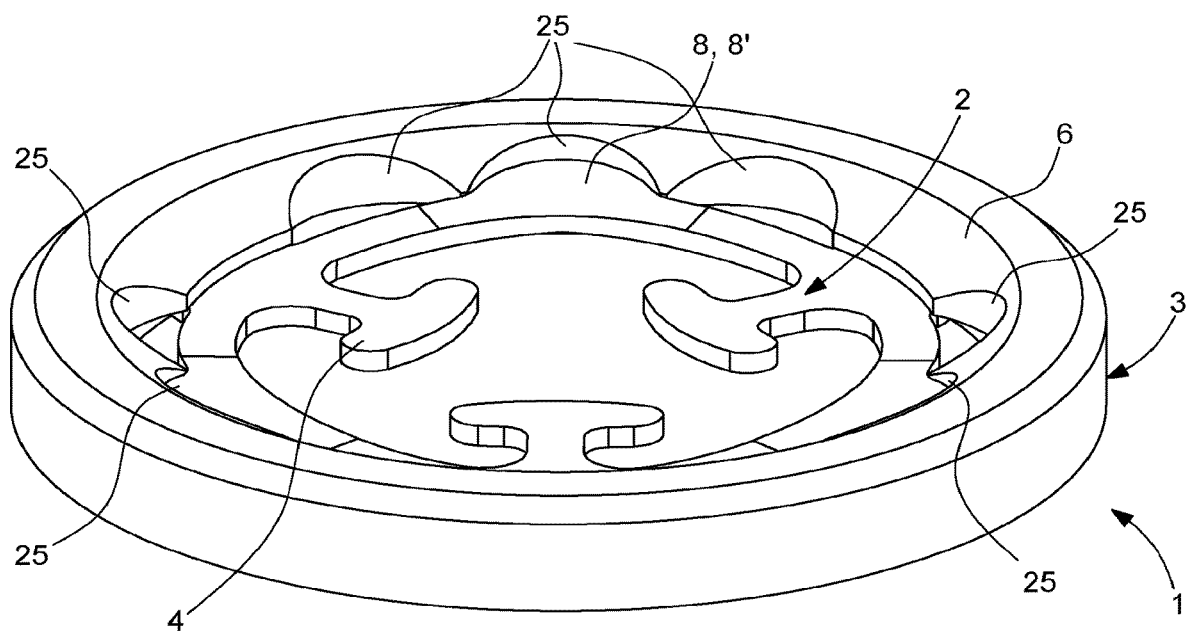
FIG. 3 represents a perspective view of the variant with three locking tabs.
Figure 4A:
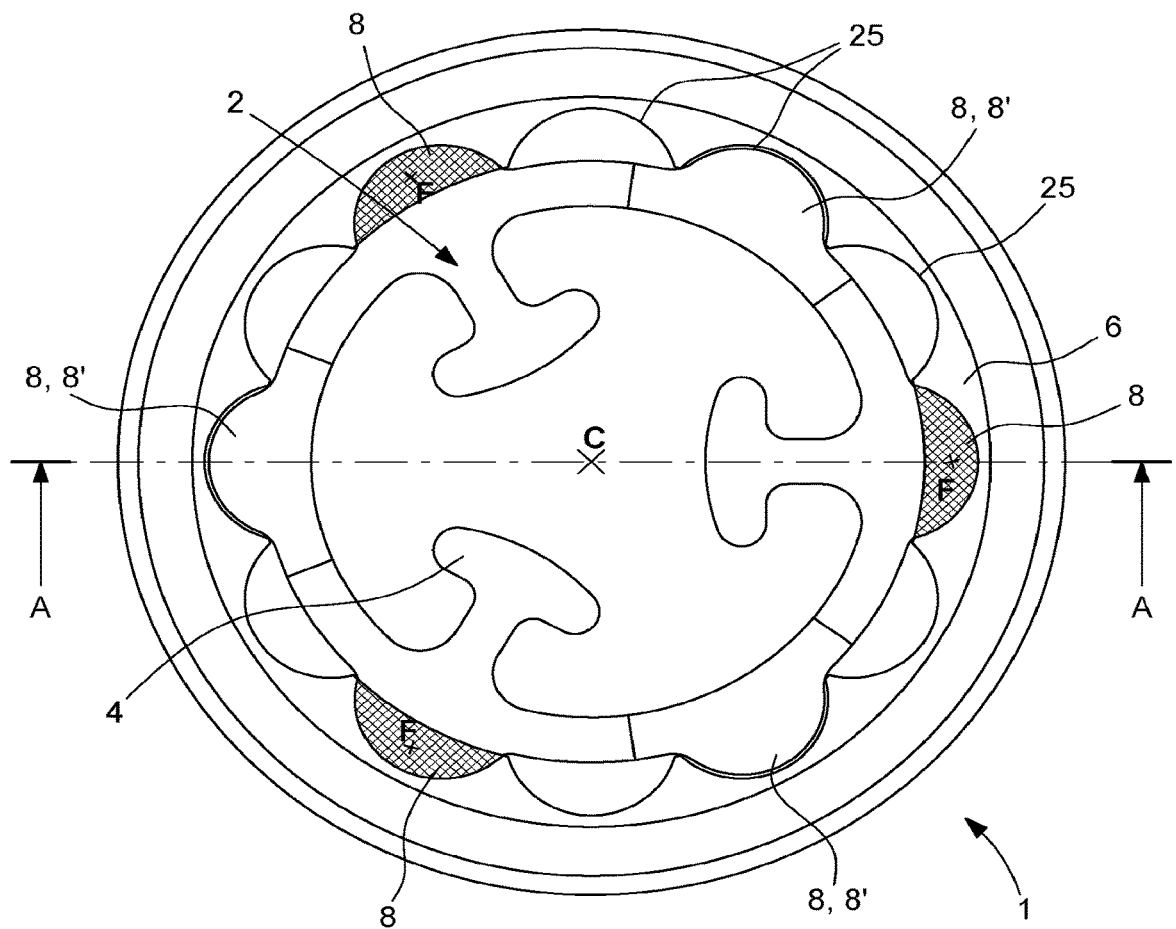
FIG. 4A is a plan view of the variant with three locking tabs which differs from the diagrams of FIGS. 2A and 2B in that the arms of the spring ring are angularly offset with respect to the locking tabs.
Figure 4B:
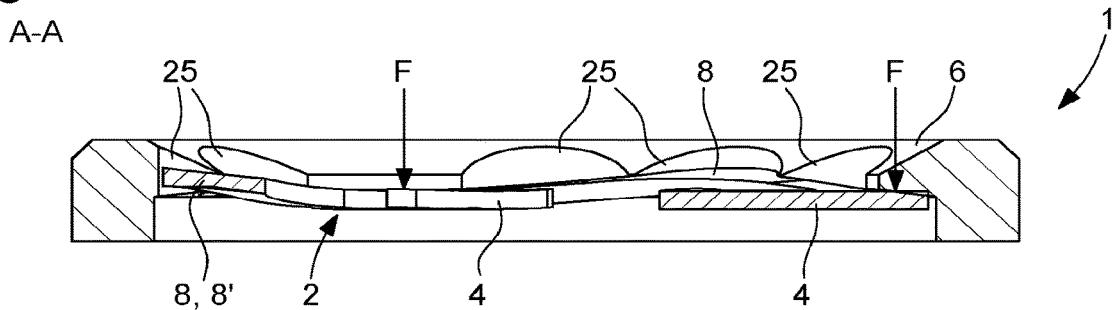
FIG. 4B represents a sectional view along the plane A-A of FIG. 4A.
Figure 4C:
FIG. 4C is a plan view of a locking tab of the spring ring respectively during mounting represented by a continuous line and after locking represented by a dotted line.

According to the invention, the tabs and the recesses are arranged such that, in the attachment position, a locking tab is surrounded by tabs positioned under the peripheral shoulder. The peripheral shoulder applies a force F on the tabs positioned under the peripheral shoulder. This force causes a deformation of the section of the spring ring disposed between the two tabs positioned under the peripheral shoulder. FIG. 4B represents a straight sectional view of the curve of spring ring 2 between the two points of application of force F. The curve can also be seen in FIG. 3. This deformation causes a change in the shape of locking tab 8' as represented in FIG. 4C, which ensures the immobilisation thereof possibly with slight angular play inside locking recess 25'. Under the effect of the deformation, the locking tab elongates slightly and is no longer free to disengage from the locking recess, with the result that the spring ring is angularly locked. It should be noted that, depending on the initial shape of the tab, the contact between the locking tab and the locking recess following deformation may occur at the base of the tab on the lateral sides or at the tip of the tab.

Figure 5B:
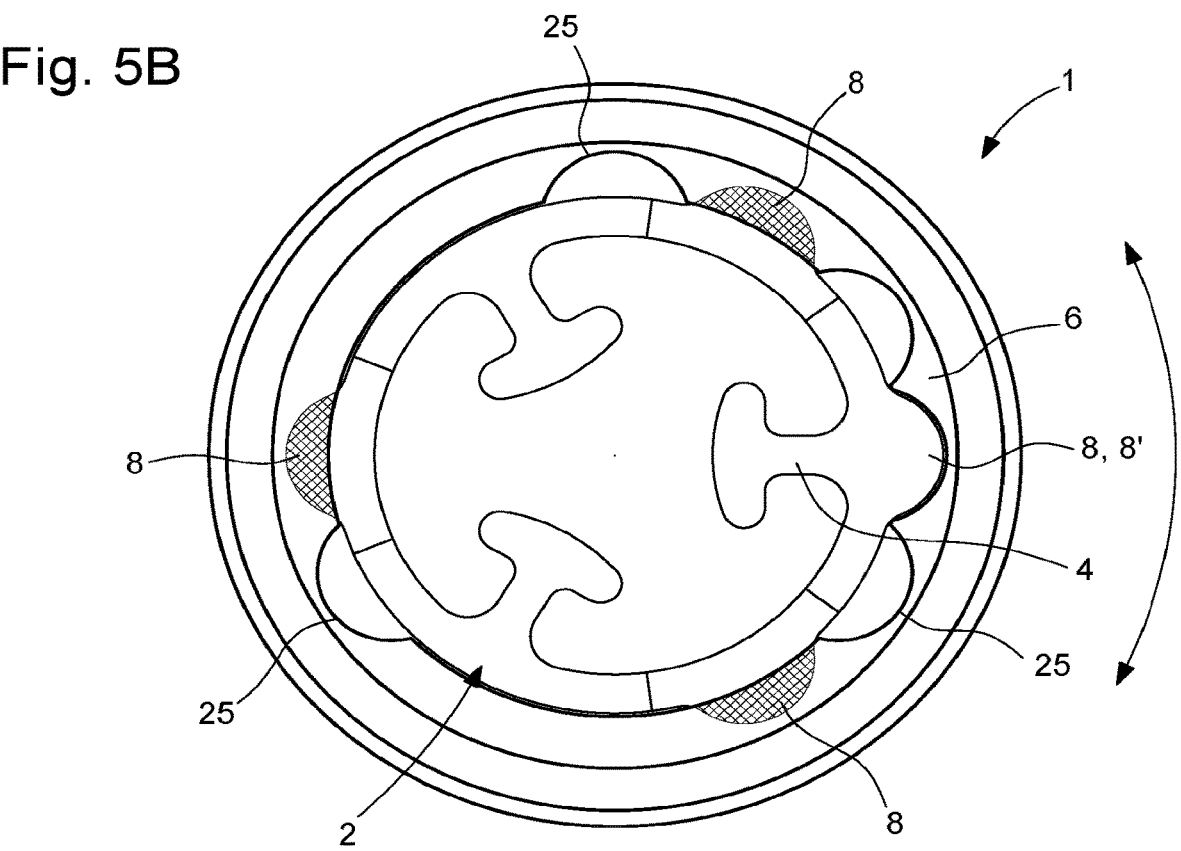

For all the variants, there are three points of application of force F on the tabs. For the preferred variant of FIGS. 2A to 4B, there is one locking tab 8' between each of the points of application of the force. For the variant of FIGS. 5A to 5B, there is only one tab 8' free to deform under the effect of the applied forces and thus to ensure the rotational locking of the spring ring. The section of the spring ring that curves is represented in FIG. 5B by the double arrow. It should be noted that the variant of FIGS. 2A-4B with a symmetrical distribution of the tabs and of the recesses is preferred to ensure optimum damping properties of the spring ring.

According to other variants that are not represented, the shock absorbing device could have two, four, five or more locking tabs.

Finally, the spring ring can be disassembled by applying a pressure to the spring ring and by rotating it so as to position each tab in front of a recess.

KEY

1. Shock absorbing device or anti-shock system
2. Elastic means, spring element or spring ring
3. Support
4. Arms
5. Pivot module
6. Peripheral shoulder
7. Rim or first rim
8. Tab or lug where 8' is the locking tab or the locking lug
9. Notch
10. Cup-like element
11. Base
13. Housing
15. Setting
16. Circular central orifice
17. Second rim
18. Outer side wall
19. Inner side wall
20. Jewel hole
21. Shoulder
22. Endstone
23. Pivot-shank
24. Arbor
25. Recess where 25' is the locking recess
F: Force or stress
C: Centre

The invention claimed is:

1. A shock absorbing device for an arbor of a wheel set of a micromechanical device, said shock absorbing device comprising:

a pivot module, a support provided with a housing accommodating the pivot module, the support being surmounted by a peripheral shoulder extending from a rim of the housing towards the center of the support, said peripheral shoulder comprising a plurality of recesses opening onto the housing with at least one of said recesses forming a locking recess, a spring ring configured to adopt respectively a mounting position and an attachment position with respect to the support, said spring ring being arranged between the peripheral shoulder and the pivot module in order to exert an elastic force on said pivot module when the spring ring is in the attachment position, said spring ring being provided on an outer periphery thereof with a plurality of tabs with at least one of said tabs forming a locking tab, the plurality of tabs extending radially away from the center of the support and giving the spring ring an outer diameter which exceeds an inner diameter of the peripheral shoulder, the plurality of tabs cooperating with the peripheral shoulder during a mounting and bayonet attachment of the spring ring to the support, the recesses of the support having dimensions at least equal to dimensions of the tabs to allow engagement of the tabs in corresponding recesses during the mounting, wherein a number of recesses is greater than a number of tabs with at least one extra recess forming the locking recess, and in the attachment position, one part of the tabs is positioned under the peripheral shoulder and another part comprising at least said locking tab is positioned in said locking recess, said locking recess being surrounded on each side by a tab positioned under the peripheral shoulder, each tab positioned under the peripheral shoulder being subjected to a force applied by said peripheral shoulder, said force causing a curved deformation of a section of the peripheral shoulder extending between the tabs positioned under the peripheral shoulder, the deformation of the locking tab disposed on said section allowing the spring ring to be locked in the attached position thereof.

2. The shock absorbing device according to claim 1, wherein the recesses are disposed on at least one angular portion of the peripheral shoulder in a series of three recesses arranged side-by-side, two recesses at the ends of the angular portion respectively allow engagement of two tabs of the spring ring in the mounting position and the recess positioned at the center of the series of three recesses forming the locking recess for housing the locking tab when the spring ring is in the attachment position.

3. The shock absorbing device according to claim 1, wherein the recesses have a similar shape and dimensions to a shape and dimensions of the tabs.

4. The shock absorbing device according to claim 1, wherein one of the dimensions of the recesses, chosen from a width or a depth, is substantially equal to a corresponding dimension of the tab and the other dimension, chosen from a width or a depth, is of greater size.

5. The shock absorbing device according to claim 1, wherein the tabs have a circular ear shape.

6. The shock absorbing device according to claim 1, wherein all the recesses and all the tabs have the same shape and the same dimensions.

7. The shock absorbing device according to claim 1, wherein the spring ring has 1, 2, 3, 4 or 5 locking tabs.

8. The shock absorbing device according to claim 1, wherein the tabs are four in number and the recesses are five in number.

9. The shock absorbing device according to claim 1, wherein the tabs are six in number and the recesses are nine in number.

10. The shock absorbing device according to claim 9, wherein the support comprises three series of three recesses spaced apart from each other by an angle of 120°.

11. The shock absorbing device according to claim 1, wherein the spring ring has, on an inner periphery thereof, three evenly spaced arms intended to exert the elastic force on said pivot module when the spring ring is in the attachment position.

* * * * *